United States Patent [19]
Hansen et al.

[11] 3,993,315
[45] Nov. 23, 1976

[54] AUTOMATIC PHONOGRAPHS

[75] Inventors: Svend Hansen; Nicolai Krebs Sorensen, both of Struer, Denmark

[73] Assignee: Bang & Olufsen A/S, Denmark

[22] Filed: Feb. 14, 1973

[21] Appl. No.: 332,496

[30] Foreign Application Priority Data
Feb. 14, 1972 Denmark .............................. 658/72
Feb. 14, 1972 Denmark .............................. 660/72

[52] U.S. Cl. .................................. 274/9 R; 248/20; 274/23 A; 274/39 A
[51] Int. Cl.² ...................... G11B 3/36; G11B 17/00
[58] Field of Search .................. 274/23 A, 1 L, 9 R, 274/1, 39 R, 39 A; 248/18, 17, 20, 358 R, 350

[56] References Cited
UNITED STATES PATENTS

| | | | |
|---|---|---|---|
| 242,980 | 6/1881 | Richter | 248/358 AA |
| 2,580,815 | 1/1952 | Mooney | 248/18 |
| 3,059,882 | 10/1962 | Staar | 248/20 |
| 3,284,085 | 11/1966 | Zimmerman | 274/1 R |
| 3,510,137 | 5/1970 | Freier | 248/358 R |
| 3,578,340 | 5/1971 | Fortune | 274/23 A |
| 3,592,477 | 7/1971 | Winn | 274/9 A |
| 3,599,988 | 8/1971 | Norris | 274/23 A |
| 3,622,163 | 11/1971 | Bachman | 274/23 A |
| 3,661,397 | 5/1972 | Worth | 274/23 A |

*Primary Examiner*—Harry N. Haroian
*Attorney, Agent, or Firm*—Craig & Antonelli

[57] ABSTRACT

An automatic phonograph comprising a carrier chassis for a turn table and a pick-up arm, said carrier chassis being supported resiliently by a main chassis, a turn table driving motor, means for moving the tone arm horizontally from an outer inoperative position of rest to a position above the inlet of the sound groove of a record placed on the turn table, means for lowering and raising the tone arm to and from engagement with the record, means for selecting or detecting the tone arm position in which the tone arm is lowerable into engagement with the inlet sound groove of the record, according to the size of the record, stop means responsive to the tone arm reaching an inner position in which it has finished playing of the record and operable to cause the tone arm to be raised and moved outwardly to its inoperative position and to cause the driving motor to be switched off and switch means for energizing the driving motor and the tone arm moving means, the driving means for moving the tone arm both horizontally and vertically being controlled by switch means actuated in response to selection and/or detection of the appropriate conditions for the said tone arm moving means to be actuated, all in such a manner that there is no mechanical driving connection between the turn table and the tone arm moving means and that at least the major manual controls are constituted by switch means located on the main chassis and being without mechanical operational connection with the operation performing means on the carrier chassis.

40 Claims, 6 Drawing Figures

AUTOMATIC PHONOGRAPHS

The present invention relates to a phonograph having at least some of its functions controlled in an automatic manner. There are different degrees of possible automatization of phonographs, but basically an automatic phonograph comprises a start swtich and means for automatically bringing the tone arm from an initial inoperative position of rest into playing engagement with a record placed on the turn table. Preferably the automatic controls should also be able to stop the turn table after playing of the record and bring the tone arm back into its initial position. As examples of other functions can be mentioned detection of the acutal size of the record to be played and adjusting of the turn table rotation speed according to the requirements.

Normally the turn table and the tone arm are mounted on a carrier chassis which is suspended resiliently in a main chassis in order to protect the sound reproducing system from exterior movements which would affect both the rotation velocity of the turn table and the horizontal and lateral pressure of the stylus of the pick-up against the sound groove of the record being played. Especially in phonographs for high quality sound reproduction it is important that the said carrier chassis be as independent as possible of any external forces.

It is customary practice that the power for moving the tone arm is taken from the driving motor of the turn table by means of an intermediate cam disc driven by the shaft of the turn table, but this is no ideal solution, since the rotation speed of the turn table is inevitably affected by such a mechanical gear arrangement. It also affects the sound reproducing system adversely if manual controls are located on the resiliently supported carrier chassis.

It is the purpose of this invention to provide a phonograph in which the usual driving connection between the turn table and the tone arm moving means is eliminated.

According to the invention there is provided a phonograph in which separate driving means for moving the tone arm both horizontially and vertically are controlled by switch means actuated in response to selection and/or detection of the appropriate conditions for the said tone arm moving means to be actuated. Hereby the tone arm movements may be controlled entirely independent of the turn table, e.g. for raising the tone arm in response to the playing of a record being finished.

According to a further general feature of the invention not only the driving connection from the turn table is avoided, also mechanical actuation connections between the two chassises may be avoided by consequent use of operation means to be actuated by remote control through flexible control and energisation connections such as electric wires, whereby all manually operable control means may be located on the main chassis. In case of a high degree of automatization it is necessary to work with different detecting devices located in connection with the carrier chassis, e.g. for detecting the size of the record to be played, and according to the invention it is also possible to avoid mechanical connections between the two chassises in this respect, since the different detecting signals may be conducted through flexible wires to components located on the other chassis, should this be necessary.

In this manner, according to the invention there may be provided an automatic phonograph of extremely high quality and nevertheless of a high degree of automatization including detecting of the presence and the size of a record placed on the turn table, operation of the tone arm in accordance therewith and selection of the correct speed rotation of the turn table, and further including manually operable controls for compulsory effecting the different functions, all without the use of mechanically operative connections between the two chassises except, if desired, for easily flexible and resilient connections such as a rubber driving belt between the turn table and a driving motor mounted on the main chassis, and without using the turn table for driving any other operation means.

The invention is described in more detail in the following with reference to the accompanying drawing, in which.

Figure 1:
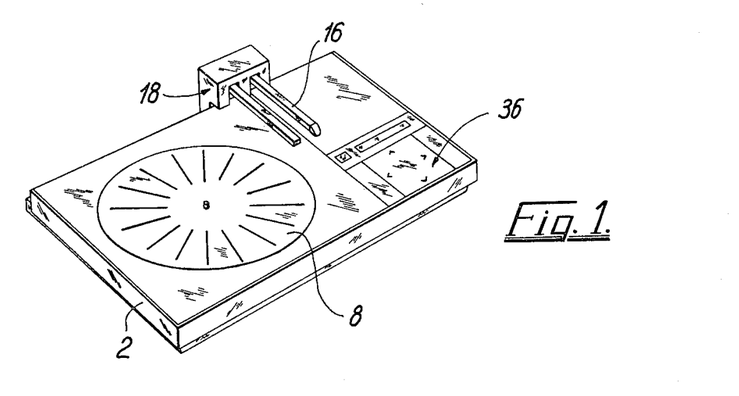
FIG. 1 is a perspective view of a preferred embodiment of a phonograph according to the invention.
Figure 2:
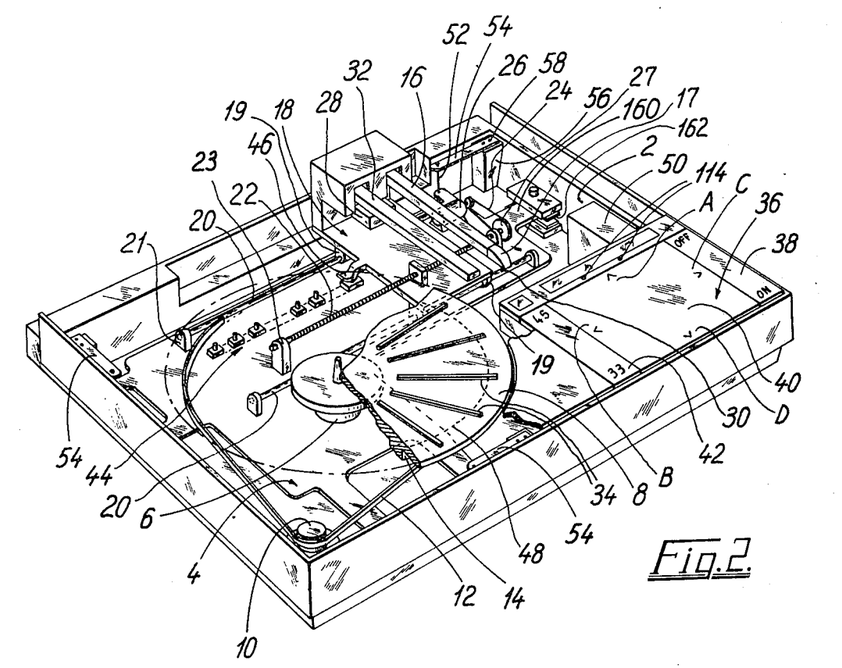
FIG. 2 is a corresponding view shown with the top cover plates and the turn table removed from the phonograph.

The phonograph shown comprises an exterior box shaped main chassis 2 and an interior carrier chassis 4 which is suspended in a resilient manner in the main chassis as explained in more detail below. On the carrier chassis 4 there is mounted a bearing 6 for the turn table 8 driven by a motor 10 mounted on the main chassis, the driving connections being established through a resilient driving belt 12 driving on an annular flange 14 adjacent the underside of the turn table.

A tone arm 16 having a pick-up head 7 is mounted on a carriage 18 having lower sliding bushings 19 by mens of which the carriage 18 is mounted slidably along a pair of guiding rods 20 rigidly secured to the chassis 4 by means of brackets 21, A rotatable screw spindle 22 is mounted in bearings 23 on the chassis 4 and extends through a nut 25 rigidly secured to the carriage 18, so that when the spindle 22 is rotated the carriage will be displaced along the guiding rods 20. The spindle 22 is provided with a pulley 27 connected by means of a belt 24 to the driving wheel of a motor 26 rigidly mounted on the chassis 4. The tone arm is connected to the carriage 18 so as to be swingable relatively thereto in both vertical and horizontal direction. As described in more detail in connection with FIG. 5 a solenoid 28 of the carriage 18 is operable to cause lowering of the tone arm in order to make the stylus 30 thereof engaging the sound groove of a record placed on the turn table, the tone arm being permanently biased in upward direction by means of a spring (not shown) so as to be raised from the engagement with the record when the solenoid is de-energised. In a manner not illustrated there is arranged a damping cylinder between the tone arm and the carriage 18 in order to ensure that upon actuation of the solenoid 28 the tone arm is lowered with a suitably damped movement against the record. It will be appreciated that in case of a current failure the tone arm will automatically be raised into its upper position by means of the said spring.

As explained in more detail below the tone arm is horizontally swingable relatively to the carriage 18 in such a manner that the stylus of the tone arm may be moved a certain distance towards the centre of the record whereupon a tone arm displacement detector connected with the carriage 18 will be actuated so as to produce a control signal causing the motor 26 to rotate the spindle 22 and thus move the carriage 18 until the tone arm again assumes its normal angular position relatively to the carriage 18. In this manner the motion of the carriage 18 will be servo controlled and require no particular lateral pressure on the stylus 30.

On the carriage 18 there is mounted a rigid arm 32 which generally extends parallel with the raised tone arm 16 and adjacent its outer end fitted with a light bulb and a photo cell described in more detail below and adapted to detect the presence of the edge of a record placed on the turn table 18 in response to being moved across this edge from outside the record periphery overhead the edge, so as to cause carriage 18 to stop and the tone arm 16 to be lowered when thereafter the tone arm is moved into a position with its stylus situated overhead the inlet sound groove of the record.

The turn table is provided with a number of radial ribs 34 which are slightly upstanding from the top surface of the turn table. This top surface is made at least to some degree shiny, e.g.consisting of aluminium, while the record carrier ribs 34 are black and non-shiny, e.g. made of plastics. Therefore as explained below, when the carriage arm or slave arm 32 is moved from outside towards the turn table center its photocell will receive a train of light impulses as long as it is travelling over the rotating turn table, while when coming to a record edge the photocell will receive a steady light signal, and this difference makes it possible to detect the record size and to cause the tone arm to be lowered at the correct place for initiating playing of the record The phonograph is provided with a switch board 36 connected with the main chassis 2 and comprising a manual switch actuator plate 38 for an ON and OFF switch located underneath either end of the plate, respectively, an actuator plate 40 for tone arm movement control switches, and an actuator plate 42 for two speed adjustment switches enabling the turn table speed to be manually set at either 33 or 45 r.p.m. A logic control unit 50 is mounted on the main chassis and is electrically connected to all the different switches, motors etc. The said actuator plates are tiltably mounted in order to enable the underlying switches to be actuated by a downward pressing on the respective plate portions; however this arrangement will not be described in more detail, since in itself it forms no part of the present invention. The switchboard 36 could be substituted by any known switch arrangement comprising switches for ON/OFF, "45/33" tone arm up/down, and fast tone arm movement forwardly/rearwardly respectively.

In connection with the carrier chassis 4 there is arranged a row of switches 44 operable to be sequentially actuated by a swtich actuator 46 on the carriage 18 as the carriage is moved along the spindle 22.

Briefly, the operation of the phonograph is as follows:

When a record 48 has been placed on the turn table the ON switch is actuated manually. This causes the turn table motor 10 to start and also the carriage driving motor 26 to start rotating the spindle 22 so as to move the carriage 18 towards the turn table. As long as the photo cell in the outer end of the slave arm 32 receives an intermittent light signal due to the passage of the non-reflecting ribs 34 on the rotating turn table the motor 26 will continue to drive the spindle 22 and therewith the carriage 18, but when the intermittent light signal dissappears and becomes continous in response to the photo cell passing across the edge of the record the control unit 50 will cause the switches 44 to be operative, so that when the actuator 46 reaches the next switch 44 a signal will be sent to the logic unit 50 which then actuates the tone arm lowering solenoid 28 and de-energises the motor 26. The different switches 44 are positioned so as to each correspond to a standard size of the commerically available records. Thereafter the record is played, the motor 26 being intermittently actuated as mentioned above. If it is desired to stop playing before the end of the record is reached the OFF switch may be manually actuated whereby the tone arm is raised and the motor 26 started with inversed direction of rotation so that the carriage 18 is moved back into its initial position in which one of the switches 44 is actuated so as to cause the motor 26 as well as the turn table motor 10 to stop. Otherwise the record will be played out, and when the carriage 18 reaches that of the switches 44 which correspondends to a normal innermost position of the tone arm the control unit 50 will receive a signal causing the tone arm to be raised and the motor 26 to be reversed, whereafter the system returns to its initial position. In a preferred embodiment the arrangement is such that when the stylus enters the outlet sound groove, which is normally made with increased pitch, the correspondingly increased displacement velocity of the tone arm will cause the raising and the return of the tone arm even before the said switch is being reached, see further explanation below.

The switch actuator plate 40 is operatively connected with four underlying switches (not shown) located one adjacent each of the four edges of the plate 40 and all connected to the control unit 50. Pressing the plate at mark A will cause the tone arm to be raised, pressing at marks B and C will cause the carriage 18 to be moved inwardly and outwardly, respectively, and pressing at mark D will cause lowering of the tone arm.

It will be appreciated that apart from the resilient suspension means and the resilient driving belt 12 of the turn table all connections between the carriage 18 and the carrier chassis 4 at one side and the main chassis at the other side can be established through flexible electrical wires and that the turn table is completely without mechanical connection with the tone arm control system, whereby optimal operation conditions are obtained. It is also very important that there are no manually operable control means located on the resiliently suspended chassis 4.

Hereafter the single features of the phonograph shall be described in more detail:

1. Record size detector and tone arm control

Figure 3:
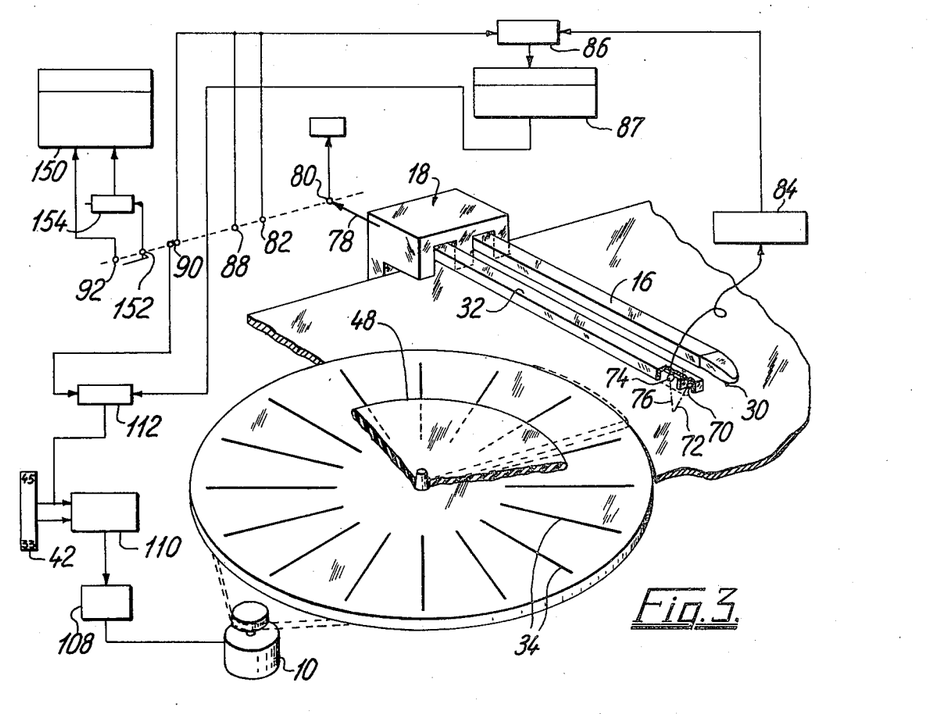
FIG. 3 is a perspective view illustrating the record size detecting means.

At the outer end of the slave arm 32, as shown in FIG. 3, there is mounted a lamp 70 from which a light beam 72 is sent downwardly at an inclined angle, and a photo cell or resistor 74 is mounted adjacent the lamp 70 so as to be able to receive the light beam 76 which is reflected from the shiny turn table surface when the slave arm moves over this surface. In FIG. 3 the switches 44 are shown schematically on a line along the carriage 18, and the actuator 46 is represented by an arrow 78 projecting from the carriage. In the initial position shown the actuator 78 actuates a stop switch 80 which was operated the last time the carriage returned to the initial position, and this switch is connected to the control unit 50 so as to not prevent renewed start of the carriage according to the well known control principles. When the manual ON switch is operated the carriage motor 54, the turn table motor 10, and the lamp 70 are energized. By the forward movement of the carriage 18 the slave arm is moved over the edge of the turn table and the actuator 78 engages a switch 82 located at a position corresponding to the stylus of the tone arm being situated above the inlet sound groove of a 30 cm record. The diameter of the turn table is approximately 30 cm, or at least the exterior diameter of the ring shaped area occupied by the non-shiny ribs 34 is less than 30 cm, i.e., in the embodiment shown the ribs 34 do not project outside the periphery of a 30 cm record. On the other hand, the ribs 34 project outside the periphery of a 25 cm record at least as far as to a position underneath the lamp 70 when the carriage 18 assumes the position in which it actuates the switch 82.

The photo responsive sensor 74 is connected to a pulse responsive circuit 84 which is adapted to produce an output signal of a first character when the sensor 74 produces an intermittent signal due to periodic passage of the non-flecting ribs 34 through the point of reflection of the light beam 72, and an poutput signal of a second character, e.g. no output at all, in response to the sensor 74 receiving steady light. A more detailed description of such a pulse responsive circuit should not be necessary at this place, since the design thereof will be a matter of ordinary skill only. The output from the pulse detector 84 is led to an ABD gate 86 which is also connected to the switch 82 and serves to energise the tone arm lowering means and stop the carriage motor 26 in response to actuation of the switch 82 and simultaneous occurrance of an output signal of said second character from the pulse detector.

Thus, if the record 48 placed on the turn table is a 30 cm record the sensor 74 will not be subjected to intermittent light, and when the carriage 18 reaches the position in which it actuates the switch 82 the motor 26 will be stopped and the tone arm lowering means will be operated so as to start playing of the record.

If the record is of smaller diameter, or if there is no record at all on the turn table, the tone arm lowering means will not be actuated when the carriage 18 reaches the switch 82, because the sensor 74 will then receive an intermittent light signal and thereby prevent the gate 86 from operating the said lowering means. Under these conditions, therefore, the carriage motor 26 will continue to move the carriage so that the actuator 78 passes the switch 82. The next switch 88 is placed so as to be operated by the actuator 78 when the carriage 18 reaches or passes the position in which the stylus 30 is situated above the inlet sound groove of a 25 cm record. Therefore, if a 25 cm record is present on the turn table the intermittent light signal on the sensor 74 will have disappeared when the switch 88 is actuated, and thereby the gate 86 will react and cause the tone arm to be lowered. In case of a smaller record — or no record — the carriage movement will continue as before.

The next swtich 90 is placed correspondingly so as to be able to cause lowering of the tone arm for playing a 17 cm record if the light pulse detector 84 has registered the disappearance of the intermittent light on the sensor 74.

If there is no record on the turn table, i.e., if the manual ON switch has been actuated by mistake, the carriage will proceed beyond the switch 90 and reach an end stop switch 92 which, when operated by the actuator 78, causes the carriage motor 26 to reverse and thus drive the carriage rearwardly into its initial position in which it stops when the switch 80 is actuated. In this manner the stylus 30 is protected against being lowered onto an empty turn table. The pulse detector 84, in a manner not illustrated, but easily understandable, may include filter means for ensuring that the intermittent signal being detected is one having a frequency reasonably close to the actual pulse frequency determined by normal speed of rotation of the turn table and the number of turn table ribs 34, i.e., reception of intermittent light of other frequencies from the exterior surroundings will not produce false detection, and furthermore the logic unit 50 may easily be so adapted that the detector 84 is operable only when a current detector in the unit 50 registers that normal current flows through the lamp 70, i.e., a dead lamp 70 will not make the pulse detector 84 believe that a non-intermittent light which could involve faulty operation unless a 30 cm record was placed in the turn table.

It will be appreciated that with the system described it is automatically detected whether there is a record placed on the turn table, and at the same time the size of the record is tested for lowering of the tone arm at the correct place. Numerous modifications of the system will be possible within the scope of the invention. An important feature is the detection of the presence of a record, since in some phonographs the tone arm moving control may well be manually operated e.g. by means of a record size selector connected with the main ON switch or the record size detection may be carried out in a manner different from that here described. Therefore, this feature will now be further described in connection with a modified embodiment illustrated in FIG. 4:

2. Record presence detector

In most phonographs there is no security against the tone arm being lowered to its playing position in case a record has not actually been placed on the turn table, and by such faulty operation the stylus of the tone head can be damaged detrimentally. A few security arrangements have been suggested, but have shown the drawback that they involved transmission or use of mechanical power taken from the turn table. In a high quality phonograph it is desirable to avoid as far as possible any mechanical connection between the turn table system and the tone arm system for not affecting the required constant speed of the turn table at one side and for — at the other side — protecting the tone head as far as possible against transfer of noise thereto.

It is a special purpose of the invention, therefore, to provide a phonograph in which the means for preventing the tone arm from being lowered in case of no record being placed on the turn table are provided so as to work without any mechanical connection with the rotating turn table system. As already examplified above this is obtained by means of an optic system in which a light sensor receives a light signal from the turn table, and the table is prepared so as to give the light signal a first character when no record is placed thereon and a second character when the detection is made with a record on the turn table; the detector is connected with means for preventing lowering of the tone arm in response to occurance of a signal of said first character, and in this manner the desired security is obtainable without any need of mechanical connection with the turn table system.

Figure 4:
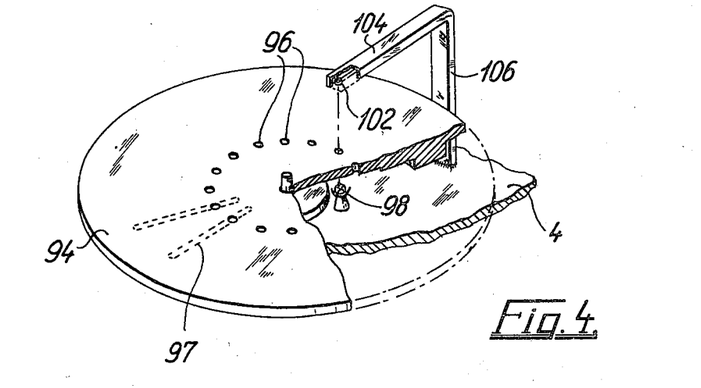
FIG. 4 is a perspective view illustrating a modified embodiment of the means for detecting the presence of a record on the turn table.

Preferably, as mentioned, the light signal indicative of the absence of a record is an intermittent signal produced by the rotation of the turn table as long as the means making the signal intermittent are not covered by a record; in this manner the detector can work in a reliable manner independent of the level of the light intensity as influenced by external light, since the difference between the first and second character of the signals is qualitative rather than quantitative. As described, the detection may be used also for effectively testing the size of the record when the light detector is moved together with the tone arm. However, the detecting principle can be used in other arrangements of which the following is an example:

In FIG. 4 there is shown a turn table 94 in which there is provided a number of small holes 96 arranged in a row on a circle concentric with the turn table inside the periphery of a record. Underneath the turn table there is placed a stationary lamp 98 sending a light beam 100 up through the holes 96 as these pass the position of the lamp, and overhead the lamp, spaced above the turn table 94, there is provided a photo cell 102 held by a stationary arm 104 projecting inwardly from an outer post 106. The photo cell 102, in a manner not shown, is connected to a pulse gate corresponding to the unit 84 of FIG. 3, so that when the turn table rotates without a record resting thereon the photo sensitive device 102 will produce an intermittent signal which is then used to effectively prevent lowering of the tone arm, while when a record is placed on the turn table the holes 96 will be covered, and no inttermittent signal will be fed to the pulse gate so that the tone arm will be allowed to be lowered.

In this connection it is of no importance how the tone arm is adapted to be moved, since it will of course be possible to provide electrically controlled means for blocking the lowering of the tone arm irrespectively of the construction of the moving system; the arrangement would be usable even in connection with manually moved tone arms, and it is deemed unnecessary to specify detailed examples of blocking means for all different, posssible tone arm moving systems, since such blocking means may be of an elementary electric or electro-magnetic kind.

The arrangement shown in FIG. 4 would be usable also for record size testing if there is provided three circular rows of holes 96, each row located slightly within the periphery of a record of the respective standard size and cooperating with a correspondingly located photo cell in the arm 104. The rows of holes could be substituted by elongated radial slots in the turn table as shown at 97.

3. Automatic speed selector

Normally the 30 and 25 cm records should be played at 33⅓ r.p.m. and the 17 cm records at 45 r.p.m. The driving motor 10 is an AC motor receiving its power from an oscillator 108 (FIG. 3) the normal frequency of which corresponds to a turn table speed of 33⅓ r.p.m. and the phonograph is started with this speed unless the manual speed selector 42 is set at 45 r.p.m. Actuation of this selector causes a control circuit 110 to be trigged whereby the frequency of the oscillator is changed to correspond to a speed of 45 r.p.m. Normally, however, it will not be necessary to set the speed manually, because the switch 90 controlling the lowering of the tone arm in case of a 17 cm record is a double switch having one switch unit connected to the gate 86 in parallel with the switches 82 and 88 and the other switch unit connected to an AND gate 112 to which also the tone arm lowering control unit 87 is connected. A trigger signal is sent from the gate 112 to the frequency control unit 110 in case of coincidal input signals on the gate 112, i.e., if actuating of the 17 cm switch 90 causes the tone arm to be lowered. This means that if there is a 17 cm record on the turn table the speed thereof will automatically be changed to 45 r.p.m. when the tone arm is lowered into playing engagement with the record.

Some 17 cm records are adapted to be played at 33⅓ r.p.m. and in these cases it will be necessary to press the "33" switch 42 in order to obtain the correct speed. The control unit 50 is easily made in such a manner that a control pulse produced by operating one of the manual speed switches 33 or 45 will be dominating over the automatic speed control. On the switch board 36 there may be provided two control lamps 114 energised alternatively according to the actual turn table velocity.

4. Tone arm playing movement control

Figure 5:
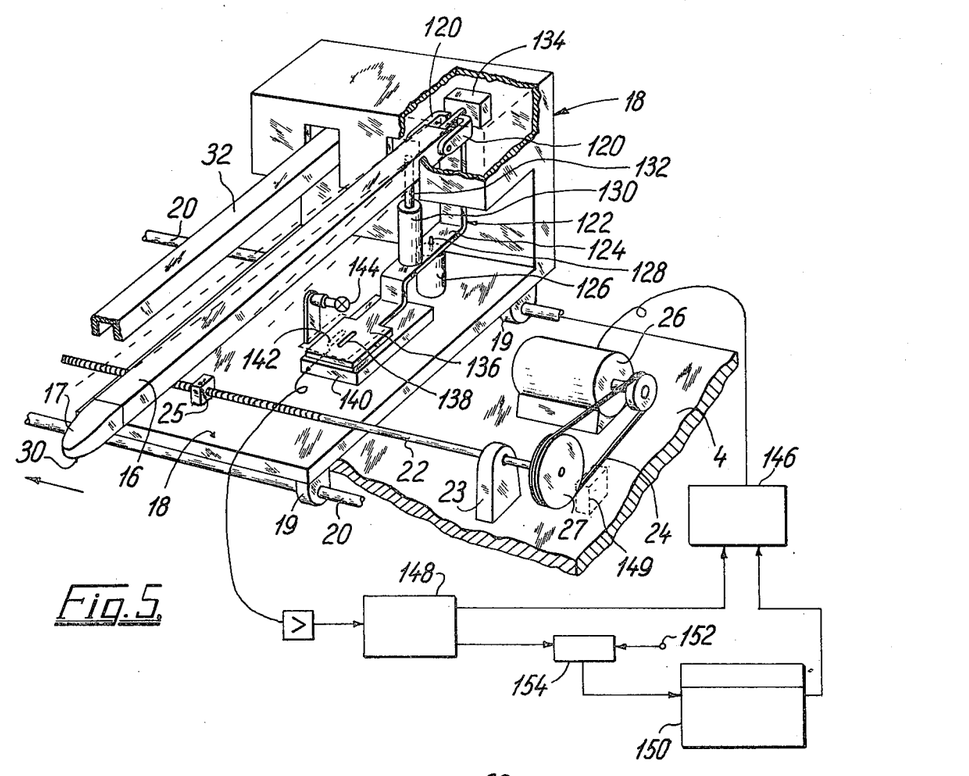
FIG. 5 is a detailed perspective view illustrating the means for controlling the movements of the tone arm.

As shown in FIG. 5 the inner end of the tone arm 16 is pivotally suspended in a pair of brackets 120 projecting from an upright portion of a mounting plate 122 having a horizontal portion 124 which is supported on a rigid post 126 so as to be easily swingable in the horizontal plane about a vertical pin 128. On the plate portion 124, in front of the pin 128, there is mounted a solenoid 130 having a movable rod shaped yoke 132 which — in a manner not shown — is spring loaded in upward direction and at its upper end engages the tone arm so as to be able to lift the tone arm to a horizontal position and maintain the tone arm in this position as long as the solenoid 130 is deenergised. When the solenoid is energised the yoke 132 is pulled downwardly against the action of the said spring (not shown), whereby the tone arm is lowered by its own weight by pivoting in the brackets 120. A counterweight 134 serves to make the effective weight of the tone arm as small as desired. The tone arm suspension in itself forms no part of the present invention and the arrangement shown in FIG. 5 is an illustrative and very simplified example only. The important feature is that for a given position of the carriage 18 the tone arm 16 may swing about the pin 128 in horizontal direction during playing of a record, and that the plate portion 124 will hereby be swung correspondingly.

The plate portion 124 has a forward extension 136 in which there is provided a middle slot 138. In a stationary housing 140 on the carriage 18 underneath the plate portion 136 there is mounted a photo cell 142, and above the plate portion 136 there is mounted a stationary lamp 144. When during playing of a record the tone arm is swung slowly in the direction of the arrow shown the slot 138 will be moved towards a position overhead the photo cell 142, i.e., this cell will start receiving a small amount of light and thereafter receive more and more light. The electric signal from the cell of photo resistor is amplified and fed to a motor control unit 146 serving to energise the carriage motor 26 so as to move the carriage until the control signal disappears, i.e., until the slot 138 by the movement of the carriage is brought away from the photo cell 142. Then the carriage movement stops until the tone arm has again swung out sufficiently to energise the motor 26. All this is described briefly only, because a servo controlled movement of a tone arm carriage is known per se in the prior art.

It is a specific feature of the invention that the device 142 responsive to angular displacement of the tone arm relatively to the carriage 18 may be used for detecting the cease of the playing of the record and the corresponding actuation of the tone arm raising means and the carriage return means. Of course, the end stop switch 92 (FIG. 3) will serve this purpose, but not all records have their innermost groove portion situated in a standard distance from the record centre. On the other hand most records have a final groove portion with increased pitch, and in mechanically controlled automatic phonographs it is well known to utilize the increase of the tone arm displacement velocity in this groove portion for causing the stop mechanism, i.e., the tone arm raising and returning means, to be actuated.

According to the invention the said tone arm raising and returning means are actuated in response to sensor means detecting an increased angular displacement of the tone arm relatively to the tone arm carriage, compared with the normal playing displacement. In normal operation the carriage motor 26 will be operated intermittently, viz. every time the photo device 142 has built up a control signal of sufficient magnitude to cause actuation of the motor 26; preferably the control circuit includes a timer (not shown) which makes the control circuit intermittently operative, e.g. for each one or two revolutions of the turntable, whereby the motor 26 starts in a more well defined manner. However, when the stylus enters the outlet groove of increased pitch the immediate displacement of the tone arm will take place with increased velocity, and the magnitude of the control signal from the photo device 142 will become unusually high. In the connection to the motor control unit 146 there is inserted a signal level detector 148 which is adapted so as to let the signal pass to the motor control unit when the level of the signal is as low as corresponding to normal playing conditions while when the signal increases beyond this level a control signal is fed to the stop control unit 150 serving to actuate the tone arm raising means 130 and the carriage motor control unit 146 for reversing the motor 26 and thus bring the carriage and tone arm system back to its initial position. Hereby the playing will be stopped when the stylus enters the outlet groove of the record.

On some records the sound groove has increased pitch between different sections or so-called bands of the record, and in order to avoid undue stopping of the playing at such places there is in the switch row 44 provided a special switch 152 (FIG. 3) between the switches 90 and 92, i.e., corresponding to a tone arm position in the very last portion of the sound producing groove of usual records, this switch 152 being connected to an AND gate 154 (FIG. 5) in the connection between the level detector 148 and the stop control unit 150. The actuator 78 is made so as to hold the switch 152 actuated from the moment it engages the switch and until it finally engages the inner stop switch 92. Thus, due to the AND gate 154 the stop control unit 150 cannot be actuated in response to increased tone arm displacement until the carriage 18 has reached a position (switch 152) in which the playing of the record is almost finished, i.e., after which there will probably be no further separate bands on the record.

The level detector 148 could be substituted by other means for detecting increased tone arm velocity either directly by registering excess swinging of the tone arm relatively to the carriage by means of mechanical switch instead of the photo cell 142 or indirectly by registering increased speed of the motor 26; in the latter case a sensor device 149 may be provided in connection with the spindle 22 or the belt 24 so as to produce an electric control signal when the speed of the motor 26 exceeds an upper limit for the normal playing operation. Such speed detectors are already known in other connections and should not be further described here.

5. Logic control unit

Though as apparent from FIGS. 3 and 5 there are different control circuits located in different connections most of these circuits are concentrated in the logic control unit 50 which is connected to the different sensor means and operation control means in such a manner that the unit 50 receives information from the different switches etc. and controls the operation units in accordance with the requirements.

Practically all electric wires in the phonograph, therefore, pass to or from the logic central control unit 50. A detailed description thereof is deemed unnecessary at this place, since the use of logic controls operable to control a number of operations in accordance with specific combinations of information supplied from different sensors and switches is well known in the general art of automatic control. Therefore it will not either be described in more detail that the control unit 50 should preferably be so adapted that the manual tone arm lowering switch D is maintained inoperative or disconnected as long as the pulse detector 84 gives an output signal corresponding to a rotating, empty turn table, and that the manual control switches for fast inward and outward movement of the carriage 18 are inoperative as long as the tone arm lowering means are operative.

The feature of the overall electric control of the different operations is advantageous irrespectively of the degree of the automatization i.e., the invention is applicable also to phonographs of a smaller degree of automatization than according to the described embodiment, e.g. where the tone arm is mounted for angular displacement in the conventional manner and no record presence or record size detector is used.

6. Suspension of carrier chasis

As shown in FIG. 2 the carrier chassis 4 is suspended in three points by means of pieces of piano string 52 which are each in their turn suspended in the outer free end of the horizontal leaf spring 54 the other end of which is fastened to holding posts 56 on the main chassis by means of screws 58. In this manner the string pieces 52 will act as pendula suspended in the leaf springs 54, i.e., the chassis 4 will be movable horizontally by swinging in the pendual strings or rods 52 and vertically by the resiliency of the leaf springs 54.

This suspension system is an outstanding and important feature of the grammophone shown. Normally in high quality grammophones the pick up arm and the turn table are mounted on a rigid carrier chassis which is resiliently suspended in a main chassis carrying the turn table driving motor and at least most of the manual control switches. A reasonably good protection against influence from outer impacts and shakings is obtained when the natural frequency of the suspended system is low, and in order to obtain a sufficiently low frequency the spring constand shall be low for the suspension springs used. Especially when the building height is small it is difficult to obtain the desired result by means of the commonly used tension or compression springs. Moreover the carrier chassis should not be too sensible to rotary oscillations, since this would give rise to an uneven rotation of the turn table. Also other kinds of oscillations will produce this result due to the gyro effect of the rotating turn table, not least because it is normally desirable to use a relatively heavy turn table. Usual helical springs are resilient not only as far as length variations are concerned, but also with respect to bending thereof, and normally they are, therefore, not very ideal for effecting the desired damping of oscillatory movements of the carrier chassis.

It is a specific purpose of the invention to provide an improved suspension system for the carrier chassis, and according to the invention this is obtained by means of the said combination of substantially horizontal leaf springs and pendulum strings or rods suspended in the outer ends of the leaf springs. It is hereby obtained that the chassis is free to oscillate in vertical direction relatively to the main chassis by virtue of the leaf springs, and a low natural frequency is easily obtainable by a combination of soft leaf springs and a relatively heavy carrier chassis, including the weight of the turn table. The pendula ensure that the chassis can oscillate freely in the horizontal plane, both in linear and rotary reciprocation, and a special effect is obtained in that by a horizontal motion of the heavy chassis relatively to the main chassis the inertia of the carrier chassis will provoke a vertical pull in the pendulum rods whereby the leaf springs are influenced to be bent and thus to counteract the displacement of the chassis, and in practice it is obtained hereby that a horizontal movement or oscillation of the carrier chassis is counteracted or damped in a highly efficient manner, the movement partly being transformed into a vertical movement which is much less critical than a horizontal movement.

Preferably there is used a three point suspension with pendulum strings or rods of equal length and with such a weight distribution of the suspended chassis that the three leaf springs are loaded with approximately identical loads. Moreover, the distance from the gravity point of the suspended chassis to each of the three suspension points should be as large as possible, and also the length of the pendulum rods should be as great as possible. The total weight of the suspended chassis should preferably be adapted to the spring constant of the leaf springs in such a manner that the natural frequency for vertical oscillations does not exceed 5 Hertz.

Of course, the driving belt between the turn table and the motor 10 should be soft and resilient enough to be substantially without influence on the oscillations of the chassis 4, and also the electric wires between the main chassis 2 and the carrier chassis 4 should be arranged so as to allow the carrier chassis to be freely movable relatively to the main chassis.

Figure 6:
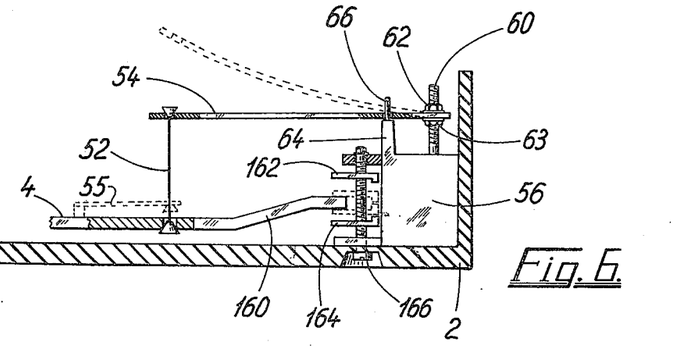
FIG. 6 is a side elevation of the suspension means of the carrier chassis.

As shown in the detailed view of FIG. 6 the fixed end of each leaf spring 54 may be secured to the post 56 by means of a single screw cut shaft or pin 60 projecting up through a hole in the leaf spring and having a nut 62 constituting an upper abutment for the leaf spring. Spaced from the shaft 60 the post 56 is provided with an upstanding edge portion 64 on which the leaf spring rests; in order to anchor the leaf spring laterally the supporting edge portion 64 may be provided with an upstanding rigid pin 66 projecting up through a hole in the leaf spring. Preferably, as shown, the leaf spring end adjacent the pin 60 is clamped between two nuts 62 and 63.

As mentioned, the leaf spring should be relatively soft, i.e., in unloaded condition it would assume a swung up position as shown in dotted lines. When the free end thereof is loaded with the suspension weight of the chassis 4 the spring should assume an almost horizontal position, i.e., the initial shape of the spring should be adapted to the weight to be suspended. The nut clamping arrangement at 62 enables a fine adjustment of the angular position of the spring.

In the example shown the leaf springs 54 are mounted on the main chassis, but of course it will also be possible to mount them on the carrier chassis as shown in dotted lines at 55 or to use leaf springs on both chassises so that the pendulum strings 52 are each mounted between the free ends of two leaf springs.

It will be understood that this suspension system according to the invention is in no way limited to use in connection with an automatic phonograph, since it will be highly advantageous in connection with any kind of phonographs, also when the turn table motor is mounted on the suspended chassis. The suspension system will also be usable in connection with other kinds of devices in which a first chases should be resiliently suspended in another chassis.

7. Locking of carrier chassis

A shown in FIG. 2 and in more detail in FIG. 6 the carrier chassis 4 is at some places, preferably adjacent the suspension areas, provided with a horizontal extension 160 the outer edge of which is situated between two clamping plates 162 and 164. These plates are mounted vertically adjustable on a screw 166 the kerb head of which is engageable from the underside of the phonograph. The screw 166 is made with a left-hand thread on the portion cooperating with the plate 164 and with a right-hand thread on the portion cooperating with the plate 162. Therefore, when the screw 166 is turned clockwise (seen from below) the two plates will be moved together and be clamped against the opposed sides of the chassis portion 160. This involves that for temporary transportation locking of the carrier chassis the chassis is locked in its normal position, i.e., it is not urged up or down. Hereby the springs 54 will be protected against permanent deformation.

What is claimed is:

1. A phonograph comprising in combination:
   a carrier chassis,
   a turn table and a tone arm mounted on said carrier chassis,
   a main chassis having means for resiliently supporting said carrier chassis,
   a turn table driving motor,
   tone arm moving means operable to move said tone arm vertically between a raised, inoperative position and a lowered playing position, said tone arm being horizontally movable over a record in both said raised and said lowered position, play stop detecting means operable to produce a play stop control signal in response to the tone arm reaching an innermost position corresponding to the completion of play of a record, said play stop detecting means being operatively connected to said tone arm raising means for causing said tone arm to be raised in response to occurrence of said play stop control signal, said tone arm moving means being energizeable independent of mechanical connection to said turn table.

2. A phonograph as claimed in claim 1 and further comprising tone arm driving means operable to drive the tone arm horizontally in its raised position inwardly from an outer inoperative position of rest to a position in which the stylus of the tone head is situated overhead the inlet sound groove of a record placed on said turn table and outwardly from a position overhead said inner position to said outer position of rest said tone arm driving means being energiseable independent of mechanical connections with the turn table.

3. A phonograph according to claim 1, and further comprising means responsive to the absence of a record on the turn table and operatively connected with said tone arm lowering means so as to prevent lowering of the tone arm in response to absence of a record on the turn table.

4. A phonograph according to claim 3, characterised in that the means for detecting the presence of a record on the turn table are constituted by a photoelectric device which, during rotation of the turn table, receives impulses of light produced by intermittent admission of light through circumferentially spaced openings in the turn table or by reflection of light from circumferentially spaced reflecting portions of the surface of the turn table, said photo electric device being connected to a registering unit operable to produce a control signal to said control unit in response to the light received by said photoelectric device disappearing or becoming non-intermittent, respectively.

5. A phonograph according to claim 4, characterised in that the registering unit receiving the intemittent output signal from the photoelectric device is combined with a filter preventing signals of pulse frequencies deviating from the expected frequency from being fed to the registering unit.

6. A phonograph according to claim 3 characterised in that the surface of the turn table is generally light reflecting and provided with radially extending carrier ribs for the ribs being different light reflecting than the turn table surface between a ribs and that the photoelectric device is mounted adjacent the turn table in carrier means participating in the horizontal movement of the tone arm and further carrying a light source from which light is sent against the turn table surface at such an angle that the light reflected from the turn table surface or from the surface of a record resting thereon will hit the photoelectric device.

7. A phonograph according to claim 6, characterised in that a registering unit receives an output signal from the photoelectric device and is combined with a filter for preventing the signals of pulse frequencies deviating from the expected frequency from being fed to the registering unit.

8. A phonograph according to claim 1 further comprising means for detecting the size of a record placed on the turn table, the size detector means being operatively connected with said tone arm driving and moving means so as to cause the inward horizontal movement of the tone arm to be stopped when the tone head stylus is situated above the inlet sound groove of the actual record and the tone arm lowering means to be actuated in this position of the tone arm.

9. A phonograph according to claim 8, characterised in that electric switch means are provided for cooperation with actuator means connected with the tone arm so as to be operable to conduct an electrical signal indicative of each of the different horizontal positions of the tone arm in which the tone arm is lowerable into engagement with the inlet sound groove of records of different standard sizes, respectively, and raisable from said innermost position, said switch means being connected to a logic control unit to which also the said record size detecting means are connected, said control unit being operable to deenergize the means for horizontally moving the raised tone arm and to energise the tone arm lowering means in response to actuation of said record size detecting means and in response to actuation of that of said switch means which corresponds to the appropriate horizontal position of the tone arm for starting playing a record of the detected size.

10. A phonograph according to claim 9, in which the logic control unit is arranged so as to receive all control signals or information from the different switches and detectors and to effect the necessary operations in accordance therewith by means of electric output control signals.

11. A phonograph according to claim 10, characterised in that input lines to the logic control unit are provided from the main start switch, main stop switch, manual speed selector, manual switcher for fast forward and fast rearward driving of raised tone arm manual switches for lowering and raising tone arm, position indicating switches of tone arm, record size detector, detector of tone arm displacement relative to tone arm carriage and that control output lines are provided from the logic control unit to the turn table driving motor, speed adjusting means of this motor, driving means for horizontal movement of tone arm, and means for lowering and raising tone arm.

12. A phonograph according to claim 8, characterised in that the record size detecting means are mounted in connection with the tone arm so as to participate in the horizontal movement of the tone arm and adapted to detect the presence of the edge of a record concurrently with or before the tone arm reaches the position in which it can be lowered into correct start engagement with the record of the particular size.

13. A phonograph according to claim 12, characterised in that the control unit is adapted so as to cause the means for driving the raised tone arm horizontally to switch over from inward driving to outward driving in response to the tone arm reaching said innermost position without the size detecting means having reacted to the presence of a record during the inward movement of the detecting means.

14. A phonograph according to claim 12, wherein the record size detecting means includes a detecting arm projecting over the record and translatable with the tone arm.

15. A phonograph according to claim 14, wherein the detecting arm is provided with means for detecting the edge of the record.

16. A phonograph according to claim 8, characterised in that the record size detecting means are connected with means for adjusting the speed of rotation of the turn table so as to automatically select correct standard speed for a given standard record size.

17. A phonograph according to claim 16, characterised in that the driving motor is powered from an oscillator producing an AC-voltage of a normal frequency causing the turn table to rotate at a first selected speed, the oscillator being connected with the size detecting means in such a manner that a control signal from the detecting means in response to detection of a record of a predetermined size causes the oscillator frequency to change corresponding to a turn table rotation speed of a second selected speed.

18. A phonograph according to claim 8, characterised in that the surface of the turn table is generally light reflecting and provided with radially extending carrier ribs for supporting a record, the ribs being less light reflecting than the turn table surface between the ribs, and that a photoelectric device is mounted above the turn table and carrier means participating in the horizontal movement of the tone arm and further carrying a light source from which light is sent against the turn table surface at such an angle that the light reflected from the turn table surface or from the surface of a record resting thereon will hit the photoelectric device.

19. A phonograph according to claim 1, in which adjacent the end of the playing path of movement of the tone arm there is provided means for registering an increase of the moving velocity of the tone arm according to the increased pitch of the outlet of the sound groove and for actuating the pick-up arm raising means in response thereto, characterised in that said registering means include electric switch over means operable to actuate electromechanical means for controlling the vertical movements of the pick-up arm so as to raise this arm.

20. A phonograph according to claim 19, in which the tone arm is mounted on a carriage adapted to be dfiven along a straight line for parallel displacement of the tone arm, the tone arm being pivotally connected to said carriage so as to be able to carry out a limited horizontal swinging relatively to the carriage, said carriage including means for detecting a selected excess swinging of the tone arm in inward direction and in response thereto for actuating means for driving the carriage inwardly with a velocity higher than the inward playing velocity of the stylus of the tone arm, until the angular displacement of the tone arm relatively to its normal position on the carriage is no longer excessive, characterised in that the means for detecting excess swinging of the tone arm relatively to the carriage are adapted to produce a graduated signal, including a first type of signal in response to normal playing displacement of the tone arm, the first signals being used for the actuation of the carriage driving means, and a second type of a signal in response to a tone arm displacement of increased velocity, said second/type of signal being used for effectively causing actuation of the tone arm raising means.

21. A phonograph according to claim 20, characterised in that in said carriage there is mounted a lamp and a light sensor, the tone arm having a plate member disposed so as to break the light beam on said sensor when the tone arm assumes its normal angular position relatively to the carriage and so as to gradually change the intensity of light hitting the sensor as the tone arm swings away from its normal position, said sensor being connected to relay means operable to produce said first signal type in response to a first change of the light intensity on the sensor and said second signal type in response to a second change of light intensity on the sensor.

22. A phonograph according to claim 1 and including manually operable switch and/or selector means for controlling different functions of the phonograph, characterised in that all manually operable switches and selectors are mounted on said main chassis and operatively connected to the operation performing means on the carrier chassis solely by flexible connection means.

23. A phonograph according to claim 1, wherein the tone arm is mounted on a carriage, and means are provided for detecting a selected excess swinging of the tone arm relative to the carriage, the excess swinging detecting means providing a first type of signal in response to normal playing displacement of the tone arm and a second type of signal in response to a tone arm displacement of increased velocity.

24. A phonograph according to claim 23, wherein the carriage is provided with a lamp and a light sensor, the tone arm having a plate member disposed so as to break the light beam on the sensor when the tone arm assumes its normal angular position relative to the carriage and so as to gradually change the intensity of light hitting the sensor as the tone arm swings away from its normal position, the sensor being connected to relay means operable to produce the first signal type in response to a first change of the light intensity on the sensor and the second signal type in response to a second change of light intensity on the sensor.

25. A phonograph according to claim 1, characterized in that mechanical clamping means for temporarily clamping the carriage chassis to the main chassis are provided at a plurality of places of the main chassis, the clamping means being manually actuatable from outside the main chassis and comprising two clamping members movable towards and away from each other so that when actuated for clamping the two members engage opposed surface portions of the carrier chassis approximately at the levels normally occupied by the surface portions when the carrier chassis is resiliently suspended in the non-clamped condition.

26. A phonograph in accordance with claim 1, further comprising tone arm driving means for driving the tone arm in a horizontal direction, registering means for sensing an increase in the moving velocity of the tone arm according to the increased pitch of the outlet of a record sound groove, said registering means comprising means for detecting a selective increase in the operating speed of said tone arm driving means and operatively connected to said tone arm raising means for raising said tone arm in response to a change in speed of said tone arm driving means.

27. In a phonograph comprising a main chassis and a carrier chassis with said carrier chassis supporting a phonograph turntable and being suspended by spring means to the main chassis, the improvement comprising said spring means including a plurality of leaf springs secured at one end to one of said main chassis and carrier chassis, each of said leaf springs projecting substantially horizontally and having a free end, and a plurality of pendulum members, each pendulum member having one end connected to a respective free end of one of said leaf springs and the other end connected to the other of said main and carrier chassis.

28. A phonograph according to claim 27, wherein said leaf springs and said pendulum members of said spring means cooperate to dampen horizontal, vertical and rotational forces between said main and carrier chassis.

29. A phonograph according to claim 27, wherein said pendulum members include a pendulum remember rod 30. A phonograph according to claim 27, wherein the pendulum member is a pendulum rod formed of piano wire.

31. A phonograph according to claim 27, wherein three sets of leaf springs and pendulum members are provided for suspending the carrier chassis in the main chassis, each set being mounted proximate to the outer contour of the carrier chassis.

32. A phonograph according to claim 27, wherein the pendulum members are of the same length.

33. A phonograph according to claim 27, wherein said pendulum members include pendulum string members.

34. A phonograph or similiar apparatus comprising a main chassis and a carrier chassis, said carrier chassis being suspended in spring means in the main chassis, said spring means comprising a plurality of leaf springs secured at one end to one of said main chassis and carrier chassis, each of said leaf springs projecting substantially horizontally and having a free end, and a plurality of pendulum members, each pendulum member having one end connected to a respective free end of one of said leaf srings and the other end connected to the other of said main and carrier chassis, and wherein a plurality of mechanical clamping means are provided for temporarily clamping the carrier chassis to the main chassis, the clamping means being manually actuable from outside the main chassis and each clamping means comprising two clamping members movable towards and away from each other so that when actuated for clamping the two clamping members engage opposed surface portions of the carrier chassis approximately at the levels normally occupied by the surface portions when the carrier chassis is resiliently suspended in the non-clamped condition.

35. An automatic phonograph having a carrier chassis, a turn table and a tone arm mounted on said carrier chassis, control means operable to raise and lower the tone arm and to move the tone arm horizontally in its raised position from an initial position of rest into an appropriate ready-to-start position above the inlet groove area of a record resting on said turn table, detector means associated with the tone arm so as to participate in the horizontal movement thereof and being responsive to passage across the outer edge of the record for producing a first control signal in response to the passage, signalling means for producing a second control signal in response to the tone arm reaching a position corresponding to the ready-to-start position above the inlet groove of each of at least two different size records, said control means being operatively connected with both said detector means and said signalling means for stopping the horizontal movement of the tone arm and the lowering of the tone arm in response to simultaneous reception of both said first and second control signals.

36. A phonograph according to claim 35, wherein said control means are operatively connected with means for adjusting the speed of the turn table so as to cause the turn table to rotate with a respective speed corresponding to the record size as detected by said detector means.

37. A phonograph according to claim 35, wherein said signalling means includes a row of individual switches mounted on said chassis and switch actuator means associated with said tone arm for sequentially actuating said switches.

38. A phonograph according to claim 35, wherein the tone arm is a tangential type tone arm swingably mounted on a carriage guided along a linear path relative to said chassis and driven therealong by servo motor means controlled by means for detecting the swinging of the tone arm relative to the carriage, said signalling means producing respective second control signals in response to the carriage reaching respective predetermined positions relative to the chassis.

39. A phonograph according to claim 38, wherein said signalling means comprises a linear row of individual switches mounted on said chassis and an actuator member provided on the carriage for sequentially actuating said switches in accordance with the movement of the carriage.

40. A phonograph according to claim 43, wherein said detector means produce said first control signal in response to movement of said detector means across the record edge from outside the record edge towards a central portion of the record.

* * * * *